United States Patent [19]

Nakahara

[11] Patent Number: 4,903,146

[45] Date of Patent: Feb. 20, 1990

[54] DIGITAL IMAGE FORMING APPARATUS

[75] Inventor: Kazuyuki Nakahara, Tokyo, Japan

[73] Assignee: Ricoh Company, Ltd., Japan

[21] Appl. No.: 281,790

[22] Filed: Dec. 9, 1988

[30] Foreign Application Priority Data

Dec. 9, 1987 [JP] Japan .................................. 62-309690
Dec. 9, 1987 [JP] Japan .................................. 62-309692
Dec. 9, 1987 [JP] Japan .................................. 62-309691

[51] Int. Cl.⁴ ............................................. H04N 1/32
[52] U.S. Cl. .................................... 358/468; 358/448;
358/498
[58] Field of Search ............... 358/468, 498, 298, 296,
358/448, 452; 364/518

[56] References Cited

U.S. PATENT DOCUMENTS

4,710,951 12/1987 Itezono ............................... 358/468
4,723,172 2/1988 Matsumoto ........................ 358/468
4,727,576 2/1988 Yoshida ............................. 358/468

Primary Examiner—Edward L. Coles, Sr.
Attorney, Agent, or Firm—Mason, Fenwick & Lawrence

[57] ABSTRACT

A digital image forming apparatus has an operation device for successively entering copying conditions with respect to at least first and second documents which are successively set on a reading device and including a display part for displaying the copying conditions entered with respect to one document at one time, where the copying conditions for the second document are entered after the first document is read by the reading device and after a writing device starts to write the first document simultaneously as when the reading device starts to read the second document, and a control device for controlling operation timings of the reading device, a memory device, the writing device and the operation device so that the writing device starts to write the second document only after the writing of the first document is completed. The control device includes a part for controlling the operation device to automatically change the copying conditions displayed on the display part between the copying conditions for the first document and the copying conditions for the second document at an arbitrary time.

10 Claims, 6 Drawing Sheets

DIGITAL IMAGE FORMING APPARATUS

BACKGROUND OF THE INVENTION

The present invention generally relates to digital image forming apparatuses, and more particularly to a digital image forming apparatus such as a digital copying machine, a facsimile machine and a printer provided with a memory capable of storing image information of two or more documents which are read.

There is a known digital copying machine provided with a memory having a plurality of storage regions so that it is possible to simultaneously carry out a write operation with respect to one document and carry out a read operation with respect to another document. In such a digital copying machine, the copying conditions for a first document are set by manipulating an operation part and the set copying conditions are displayed on a display part for the purpose of confirmation. In this case, the copying conditions displayed on the display part includes a number of copy prints to be made, a number of copy prints which has been made, a size of the copy print to be made, a tone with which the copy print is to be made and the like. In other words, the copying conditions displayed on the display part are basically the same as the information displayed on a general copying machine.

Next, when the reading of the first document is completed and the writing of the first document on the copy print starts, the copying conditions for a second document following the first document are set by manipulating the operation part and the set copying conditions are displayed on the display part for the purpose of confirmation.

However, in a case where the display is fixed to that with respect to the second document when the writing of the first document is made, it is confusing to the user because the information included in the display does not relate to the first document which is being written. It is possible to fix the display to that with respect to the first document, but in this case, it becomes impossible to confirm the copying conditions set with respect to the second document. Therefore, in either case, there is a problem in that the user may make an erroneous operation due to the display which is fixed after the copying conditions are set for the second document or after the copying conditions are set for the first document.

In other words, after the display with respect to the second document is made on the display part and the reading of the second document is completed, it is impossible to know the copying conditions under which the digital copying machine is presently operating unless the display on the display part returns to the display with respect to the first document which is being copied. For example, when the number of copy prints which has been made is not displayed and unknown, it is impossible to push a stop key of the operation part and stop the copying operation when an arbitrary number of copy prints are made.

In other words, according to the conventional digital copying machine, it is impossible to constantly be aware of the copying conditions set with respect to the first document after the second document is read.

SUMMARY OF THE INVENTION

Accordingly, it is a general object of the present invention to provide a novel and useful digital image forming apparatus in which the problems described above are eliminated.

Another and more specific object of the present invention is to provide a digital image forming apparatus comprising reading means for optically reading a document which is set thereon and for outputting an image information of the document, memory means for storing the image information from the reading means and having a memory capacity for storing image information amounting to more than one document, writing means for writing the stored image information from the memory means onto a sheet of paper so as to form a copy print of the document read on the reading means, operation means for successively entering copying conditions with respect to at least first and second documents which are successively set on the reading means and including display means for displaying the copying conditions entered with respect to one document at one time, where the copying conditions for the second document are entered after the first document is read by the reading means and after the writing means starts to write the first document simultaneously as when the reading means starts to read the second document, and control means for controlling operation timings of the reading means, the memory means, the writing means and the operation means so that the writing means starts to write the second document only after the writing of the first document is completed. The control means includes means for controlling the operation means to automatically change the copying conditions displayed on the display means between the copying conditions for the first document and the copying conditions for the second document at an arbitrary time. According to the digital image forming apparatus of the present invention, it is possible to prevent an erroneous operation of the user because it is possible to change the displayed copying conditions between that for the first document and that for the second document at an arbitrary time to suit the user's needs.

Other objects and further features of the present invention will be apparent from the following detailed description when read in conjunction with the accompanying drawings.

DETAILED DESCRIPTION

Figure 1:
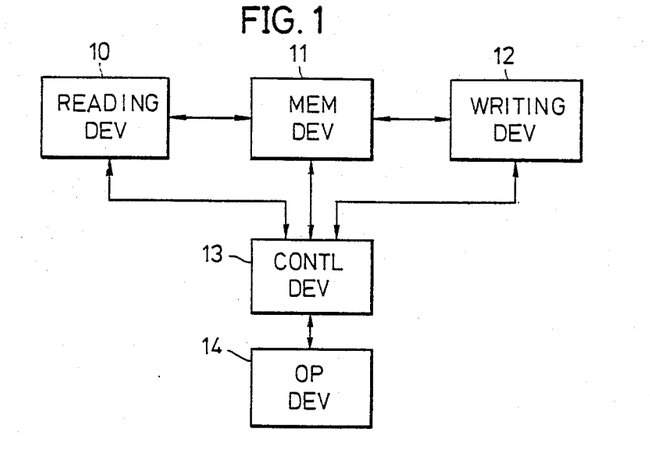
FIG. 1 is a system block diagram showing an embodiment of a digital image forming apparatus according to the present invention.

FIG. 1 shows an embodiment of the digital image forming apparatus according to the present invention. The digital image forming apparatus has a reading device 10, a memory device 11, a writing device 12, a control device 13, and an operation device 14. The reading device 10 reads a document and outputs an image data describing the document image. The image data is supplied to the memory device 11 and stored as a document image information. The writing device 12 carries out a sequence of operations to write the document image on a paper as a copy print based on the document image information stored in the memory device 11. The control device 13 controls the operation timings of the reading device 10, the memory device 11 and the writing device 12. Entries are made to the control device 13 from one or a plurality of keys (not shown) of the operation device 14 which includes a display part (not shown) for displaying various information.

Figure 2:
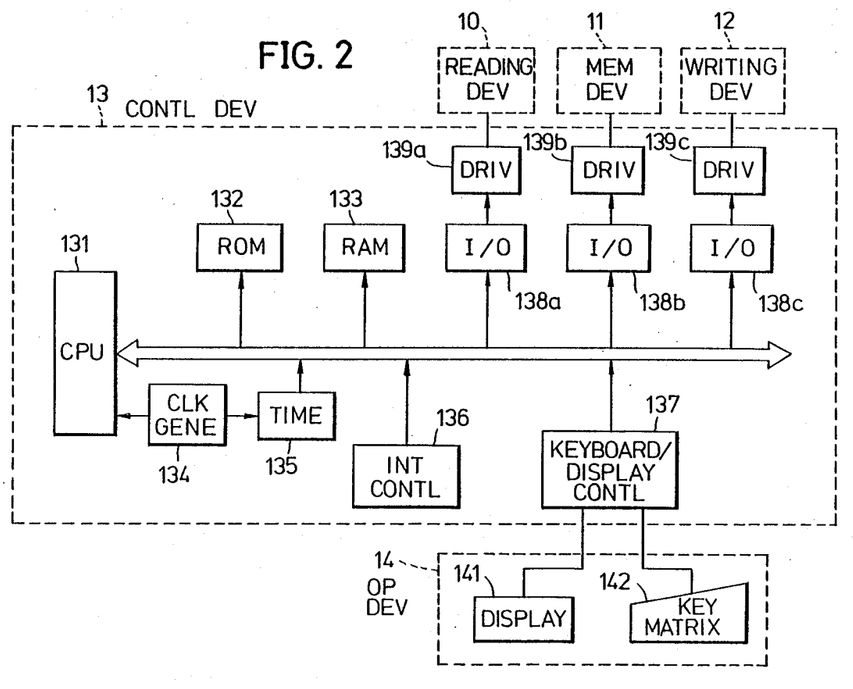
FIG. 2 is a system block diagram showing a control device and an operation device of the embodiment shown in FIG. 1 in more detail.

FIG. 2 shows the control device 13 and the operation device 14 of the embodiment shown in FIG. 1 in more detail. In FIG. 2, those parts which are the same as those corresponding parts in FIG. 1 are designated by the same reference numerals.

In FIG. 2, the control device 13 has a central processing unit (CPU) 131, a read only memory (ROM) 132, a random access memory (RAM) 133, a clock generating circuit 134, a timer 135, an interrupter controller 136, a keyboard/display controller 137, input/output interfaces 138a through 138c, and drivers 139a through 139c which are coupled as shown. The CPU 131 controls the operation of the parts constituting the control device 13. The interrupter controller 136 is used for processing interrupts. The transmission and reception of information between the operation device 14 and the control device 13 is made through the keyboard/display controller 137. The transmission and reception of information between the reading device 10 and the control device 13 is made through the driver 139a and the input/output interface 138a. The transmission and reception of information between the memory device 11 and the control device 13 is made through the driver 139b and the input/output interface 138b. The transmission and reception of information between the writing device 12 and the control device 13 is made through the driver 139c and the input/output interface 138c.

In FIG. 2, the operation device 14 has a display part 141 and a key matrix part (or keyboard) 142.

Figure 3:
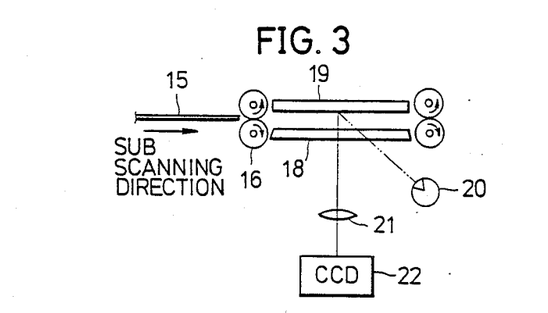
FIG. 3 generally shows a construction of a reading device of the embodiment.
Figure 4:
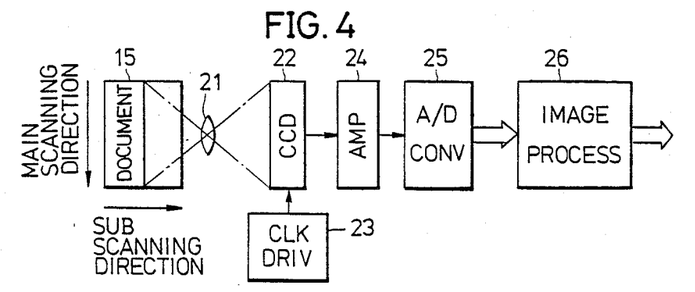
FIG. 4 is a system block diagram showing an embodiment of the reading device.

FIG. 3 generally shows the construction of the reading device 10, and FIG. 4 shows a block system of the reading device 10. In FIGS. 3 and 4, when the user inserts a document 15 between rollers 16, the document 15 is transported between a contact glass 18 and a reflection plate 19 in a sub scanning direction depending on the rotation of the rollers 16. While the document 15 is transported in the sub scanning direction, the document surface (or document image) is scanned in a main scanning direction by a light emitted from a fluorescent lamp 20. A reflected light from the document surface is imaged on a charge coupled device (CCD) 22 which is used as an image pickup element through a lens 21 and the document image is read.

In FIG. 4, the CCD 22 is driven by a clock driver 23 and outputs a change in tone of the document 15 as a change in voltage. The output of the CCD 22 is amplified in an amplifier circuit 24 and is converted into a digital signal in an analog-to-digital (A/D) converter 25. The output digital signal of the A/D converter 25 is supplied to an image processing circuit 26 which processes the digital signal into an image data for being supplied to and stored in the memory device 11 shown in FIG. 1.

Figures 5, 7, 8:
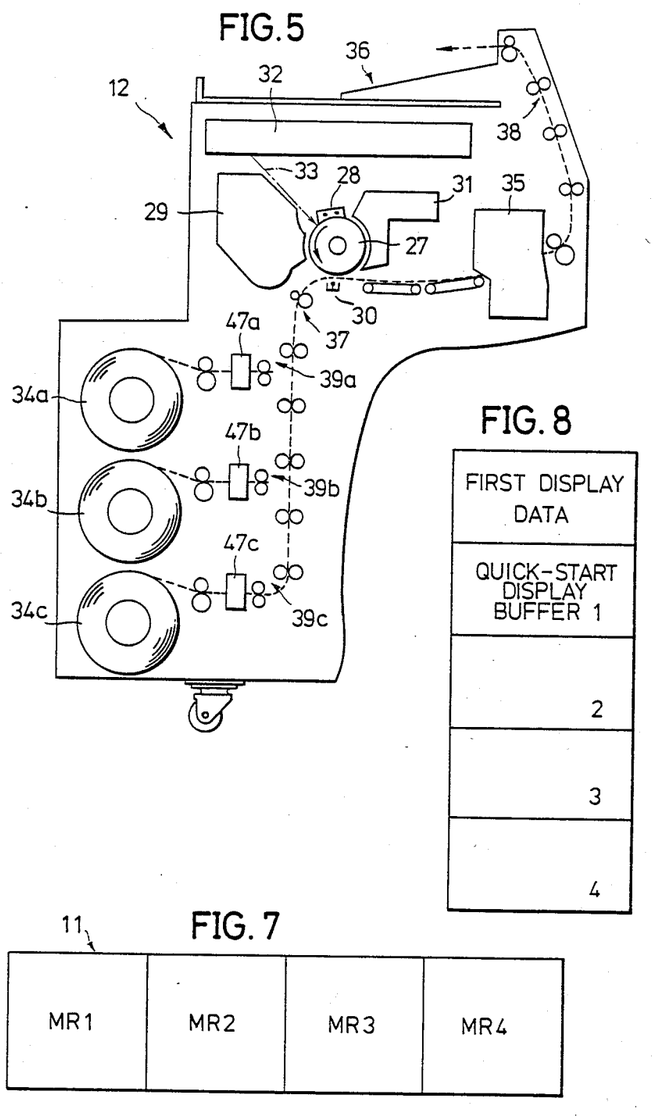
FIG. 5 generally shows a construction of a writing device of the embodiment.
FIG. 7 is a diagram showing memory regions of a memory device of the embodiment.
FIG. 8 is a diagram showing a RAM map of display data stored in a RAM of a control device of the embodiment.

Next, a description will be given of the writing device 12 by referring to FIG. 5 which shows a general construction thereof. In FIG. 5, a charger 28, a developer 29, a transfer charger 30, a cleaning unit 31 and the like are arranged in a periphery of a photosensitive drum 27 along a rotating direction of the photosensitive drum 27. A portion of the photosensitive drum 27 between the charger 28 and the developer 29 corresponds to an exposure region. The exposure takes place at the exposure region when a scanning beam 33 which is a laser beam emitted from an exposure optical system 32 and including the image information is irradiated on the photosensitive drum 27, and an electrostatic image is formed on the surface of the photosensitive drum 27. The electrostatic image is visualized into a toner image by the developer 29 and the toner image is transferred onto a sheet of paper by the transfer charger 30. The sheet of paper on which the toner image is transferred is selected from three different kinds of paper rolls 34a, 34b and 34c. In other words, the paper from the selected paper roll is cut into an appropriate size by a corresponding one of cutters 47a, 47b and 47c and the cut paper is fed by a corresponding pair of feeding rollers 39a, 39b and 39c with a timing matched to a starting end of the toner image formed on the photosensitive drum 27. After the toner image is transferred onto the paper, the paper is passed through a fixing unit 35 and is ejected onto an ejecting tray 36 by way of ejecting rollers 38. On the other hand, the surface of the photosensitive drum 27 after the transfer of the toner image onto the paper is cleaned by the cleaning unit 31 to remove the residual toner and prepare for the next image formation.

During the copying process, when the reading device 10 detects the document 15 in FIGS. 3 and 4, the writing device 12 selects one of the paper rolls 34a, 34b and 34c shown in FIG. 5 and starts to feed the paper from the selected paper roll by the corresponding pair of feeding rollers. When a tip end of the paper reaches a resist sensor 37 of the writing device 12, a data request signal is supplied from the writing device 12, a data request signal is supplied from the writing device 12 to the memory device 11 with a timing dependent on an irradiating position of the scanning beam 33 on the photosensitive drum 27. The memory device 11 supplies the stored image data (document image information) to the writing device 12 upon receipt of the data request signal. The writing device 12 converts the image data from the memory device 11 into the scanning beam 33 which is a laser beam having an intensity dependent on the image data in the exposure optical system 32. The data request signal ceases when the paper passes by the resist sensor 37.

Figure 6:
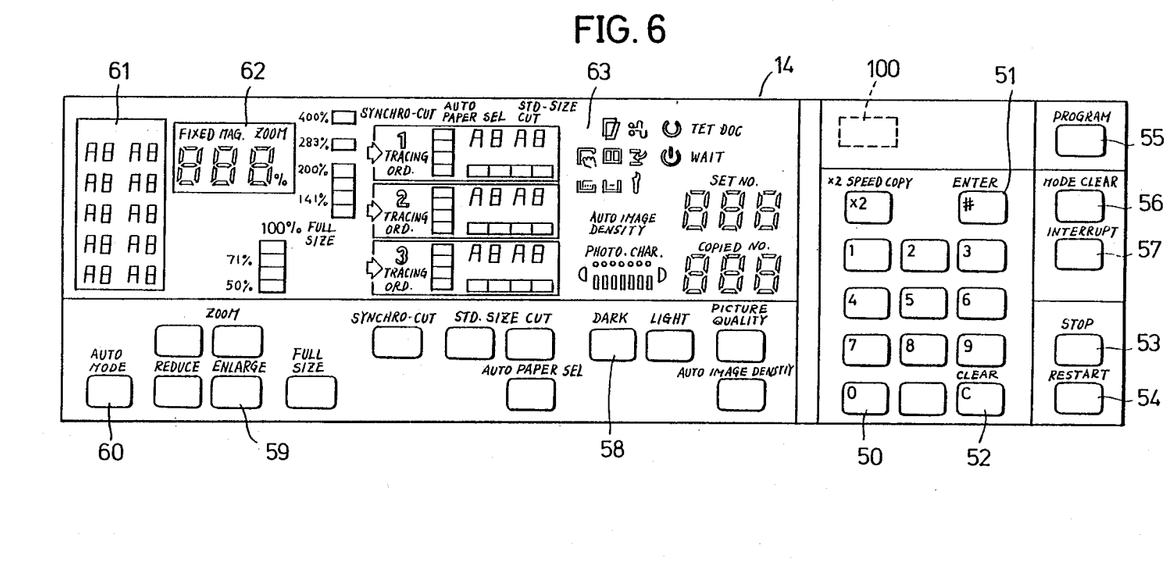
FIG. 6 is a plan view showing an operation device of the embodiment.

FIG. 6 shows a plan view of the operation device 14. A display panel of the operation device 14 has keys such as ten-keys 50, an enter key 51, a clear key 52, a stop key 53, a restart key 54, a program key 55, a mode clear key 56, an interrupt key 57, a tone setting key group 58, a magnification setting key group 59 and an automatic mode key 60, an automatic mode display part 61, a magnification display part 62, and a display part 63 for displaying the selected paper size, the number of copy prints to be made and the like.

FIG. 7 shows memory regions of the memory device 11 shown in FIGS. 1 and 2. The memory device 11 has four memory regions MR1 through MR4 which are respectively capable of storing an image information amounting to a document image of size A2. Two of these memory regions may be used together to store an image information amounting to a document image of size A1.

Hereunder, the operation of simultaneously carrying out a write operation with respect to one document and a read operation with respect to another document will be referred to as a quick-start operation. For example, when the writing device 12 uses the memory region MR1 to write the image information on one document, the reading device 10 can use the memory regions MR2 through MR4 to read another document at the same time.

The image data on the read document image is stored in the memory device 11, and the read operation is started when the present write operation is completed.

FIG. 8 shows a RAM map of display data which is stored in the RAM 133 of the control device 13 shown in FIG. 2 and includes first display data which is the display data presently displayed on the operation device 14 and second display data related to the quick-start operation. The first display data is rewritten responsive to a manipulation of a key thereby changing the display content. The first display data is transferred to a region of a quick-start display buffer indicated by a document counter when the document is read. The document counter is constituted by a region of the RAM 133 not shown in FIG. 8 and keeps the count of the number of documents read on the reading device 10.

The document counter is incremented when the document is inserted into the reading device 10 of the digital image forming apparatus. The data in a region of the quick-start display buffer indicated by a paper counter is transferred to the region of the first display data when the document is read, if at the start of the writing operation not during the setting of the mode of the digital image forming apparatus or if both the enter key 51 and the clear key 52 are pushed simultaneously. As a result, the display on the operation device 14 changes. The paper counter is constituted by another region of the RAM 133 not shown in FIG. 8 and keeps the count of the number of copy prints made on the writing device 12.

Figure 9A:
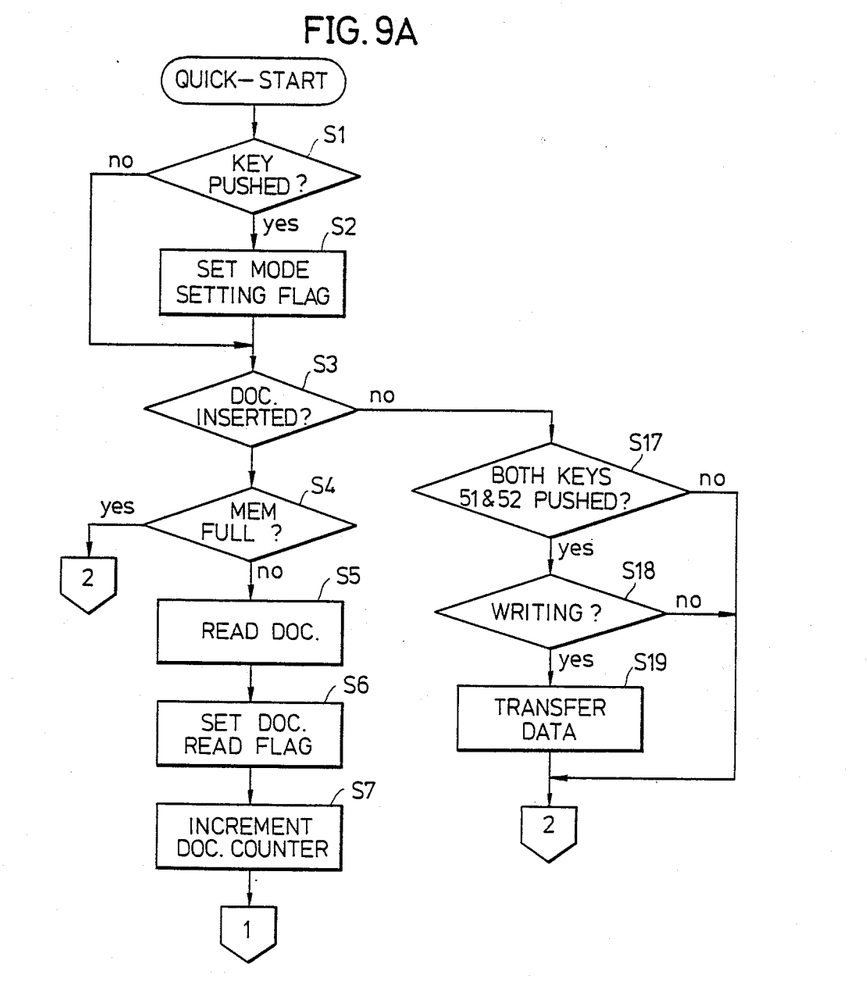
FIGS. 9A through 9C are flow charts for explaining an operation of the control device of the embodiment.
Figures 9B, 9C:
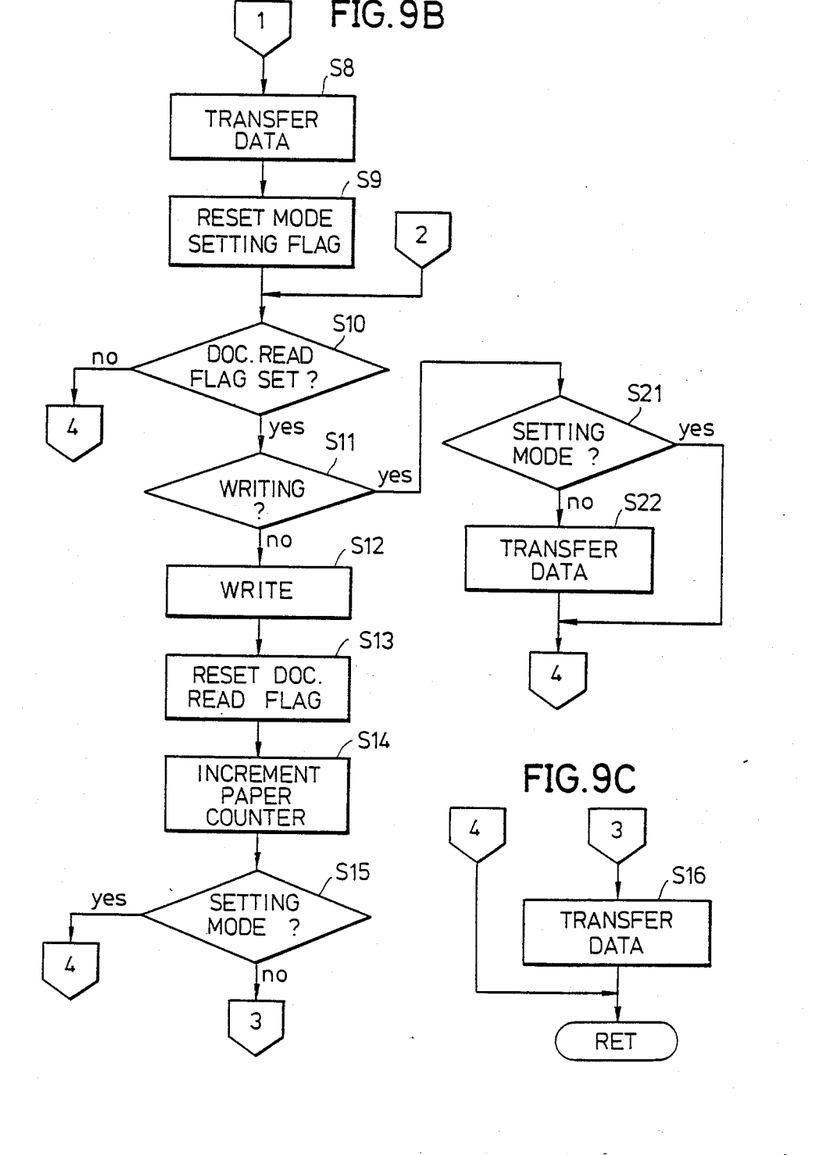

FIGS. 9A through 9C are flow charts for explaining an operation of the control device 13 during the quick-start operation.

In FIG. 9A, when the quick-start operation is started, a step S1 discriminates whether or not a key of the operation device 14 is pushed. When the discrimination result in the step S1 is YES, a step S2 sets a mode setting flag within the RAM 133 of the control device 13. The mode setting flag is set during the setting of the mode of the digital image forming apparatus, that is, when at least one key of the operation device 14 is pushed. After the step S2 or when the discrimination result in the step S1 is NO, a step S3 discriminates whether or not a document is inserted into the reading device 10.

When the discrimination result in the step S3 is YES, a step S4 discriminates whether or not the memory region of the memory device 11 is fully used and no empty memory region exists. When the discrimination result in the step S4 is NO, a step S5 reads the document and a step S6 sets a document read flag within the RAM 133 of the control device 13. The document read flag is set during the read operation of the reading device 10. A step S7 increments the document counter. Then a step S8 shown in FIG. 9B transfers the second display data to the region of the quick-start display buffer indicated by the document counter, and a step S9 resets the mode setting flag.

A step S10 discriminates whether or not the document read flag is set, and a step S11 discriminates whether or not the writing device 12 is carrying out a write operation when the discrimination result in the step S10 is YES. A step S12 carries out the write operation in the writing device 12 when the discrimination result in the step S11 is NO, and a step S13 resets the document read flag. A step S14 increments the paper counter, and a step S15 discriminates whether or not the mode is being set.

When the discrimination result in the step S15 is NO, a step S16 shown in FIG. 9C transfers the data (display data corresponding to the document image which is being written) in the region of the quick-start display buffer indicated by the paper counter to the region of the first display data, and the process is ended.

On the other hand, when the discrimination result in the step S3 is NO in FIG. 9A, a step S17 discriminates whether or not both the clear key 52 and the enter key 51 are pushed simultaneously. When the discrimination result in the step S17 is YES, a step S18 discriminates whether or not the writing device 12 is carrying out a write operation. When the discrimination result of the step S18 is YES, a step S19 transfers the data (display data corresponding to the document image which is being written) in the region of the quick-start display buffer indicated by the paper counter to the region of the first display data. After the step 19 or when the discrimination result in the step S17 or S18 is NO, the process moves to the step S10 shown in FIG. 9B.

When the discrimination result in the step S11 is YES, a step S21 discriminates whether or not the mode of the digital image forming apparatus is being set. A step S22 transfers the data (display data corresponding to the document image which is being written) in the region of the quick-start display buffer indicated by the paper counter to the region of the first display data when the discrimination result in the step S21 is NO.

When the discrimination result in the step S15 or S21 is YES or when the discrimination result in the step S10 is NO, the process is ended.

Therefore, when setting the mode of the operation device 14 before the document is inserted into the reading device 10 during the write operation of the writing device 12, the display returns to that during the write operation when the document is inserted or both the clear key 52 and the enter key 51 are pushed simultaneously.

In addition, when the write operation changes from that with respect to the first document to that with respect to the second document which follows the first document, the display during the write operation changes with the change of the document unless the mode of the digital image forming apparatus is being set.

Therefore, according to the present invention, the display can be changed automatically at an arbitrary time between the display for the first document and the display for the second document. For example, the display can be automatically changed to the copying conditions set for the first document after the copying conditions are set for the second document which follows the first document. It is also possible to automatically change the display to the copying conditions set for the first document after the second document is read.

When changing the display between that with respect to the first document and that with respect to the second document, it is desirable that an indication is included in the displayed copying conditions to indicate the document to which the present display relates. This may be simply achieved by displaying the document number on the operation device 14 based on the content of the document counter. Alternatively, it is possible to indicate the mode of the digital image forming apparatus on the operation device 14, that is, indicate the reading mode or the writing mode so that the user may relate the displayed copying conditions to the document being read or written. In this case, the read mode is indicated when the displayed copying conditions relate to the document which is being read by the reading device 10, and the write mode is indicate when the displayed copying conditions related to the document which is being written by the writing device 12. These indications may be made on a display portion 100 shown in FIG. 6. The display portion 100 may be constituted by an alpha-numeric display or an indication lamp such as a light emitting diode (LED).

Further, the present invention is not limited to these embodiments, but various variations and modifications may be made without departing from the scope of the present invention.

What is claimed is:

1. A digital image forming apparatus comprising:
   reading means for optically reading a document which is set thereon and for outputting an image information of the document;
   memory means for storing the image information from said reading means, said memory means having a memory capacity for storing image information amounting to more than one document;
   writing means for writing the stored image information from said memory means onto a sheet of paper so as to form a copy print of the document read on said reading means;
   operation means for successively entering copying conditions with respect to at least first and second documents which are successively set on said reading means, said operation means including display means for displaying the copying conditions entered with respect to one document at one time, the copying conditions for the second document being entered after the first document is read by said reading means and after said writing means starts to write the first document simultaneously as when said reading means starts to read the second document; and
   control means for controlling operation timings of said reading means, said memory means, said writing means and said operation means so that said writing means starts to write the second document only after the writing of the first document is completed,
   said control means including means for controlling said operation means to automatically change the copying conditions displayed on said display means between the copying conditions for the first document and the copying conditions for the second document at an arbitrary time.

2. A digital image forming apparatus as claimed in claim 1 in which said control means includes means for controlling said operation means to automatically change the copying conditions displayed on said display means from the copying conditions for the first document to the copying conditions for the second document after said writing means starts to write the first document.

3. A digital image forming apparatus as claimed in claim 2 in which said display means includes indication means for indicating whether the copying conditions displayed on said display means relates to a document being read by said reading means or a document being written by said writing means.

4. A digital image forming apparatus as claimed in claim 2 in which said control means includes means for keeping a count of a number of documents read by said reading means, and said display means includes indication means for indicating said count of the number of document read.

5. A digital image forming apparatus as claimed in claim 2 in which said control means includes means for controlling said operation means to automatically change the copying conditions displayed on said display means from the copying conditions for the second document to the copying conditions for the first document after said reading means completes the reading of the second document.

6. A digital image forming apparatus as claimed in claim 5 in which said display means includes indication means for indicating whether the copying conditions displayed on said display means relates to a document being read by said reading means or a document being written by said writing means.

7. A digital image forming apparatus as claimed in claim 5 in which said control means includes means for keeping a count of a number of documents read by said reading means, and said display means includes indication means for indicating said count of the number of document read.

8. A digital image forming appartus as claimed in claim 2 in which said control means includes means for controlling said operation means to automatically change the copying conditions displayed on said display means from the copying conditions for the second document to the copying conditions for the first document after the copying conditions are entered for the second document.

9. A digital image forming apparatus as claimed in claim 8 in which said display means includes indication means for indicating whether the copying conditions displayed on said display means relates to a document being read by said reading means or a document being written by said writing means.

10. A digital image forming apparatus as claimed in claim 8 in which said control means includes means for keeping a count of a number of documents read by said reading means, and said display means includes indication means for indicating said count of the number of document read.

* * * * *